United States Patent [19]

Phillips

[11] 4,099,313
[45] Jul. 11, 1978

[54] METHOD OF CONVERTING MOTOR CAR

[75] Inventor: Charles Walter Phillips, Pompano Beach, Fla.

[73] Assignee: Grandeur Motorcar Corp., Pompano Beach, Fla..

[21] Appl. No.: 823,170

[22] Filed: Aug. 9, 1977

[51] Int. Cl.² ............................................. B60P 3/26
[52] U.S. Cl. ................................. 29/416; 29/401 B; 29/428; 29/469; 296/28 R; 296/26; 296/99 R
[58] Field of Search .................................. 296/16–18, 296/28 R, 28 A, 28 K, 150, 26, 27, 99 R; 29/401 B, 155 R, 416, 428, 469

[56] References Cited

U.S. PATENT DOCUMENTS

| 1,621,675 | 3/1927 | Masury | 296/28 A |
|---|---|---|---|
| 2,425,948 | 8/1947 | Lucien | 296/28 A |
| 3,309,759 | 3/1967 | Vittone | 29/401 |
| 3,487,532 | 1/1970 | Phillips | 29/416 |
| 4,014,585 | 3/1977 | Earnhart | 296/16 |

Primary Examiner—Richard A. Bertsch
Attorney, Agent, or Firm—Oltman and Flynn

[57] ABSTRACT

A conventional sedan is converted to a car with a lengthened engine compartment and a body which is correspondingly shortened immediately behind the door posts. Longitudinal sections of the frame below the car body behind the door posts are removed and welded into the frame at the engine compartment. Corresponding sections are removed from the roof, floor and drive shaft tunnel immediately behind the door posts to divide the car body into front and rear sections, after which these sections are welded back together to provide the converted shortened body. Structural reinforcements are added for the lengthened frame at the engine compartment. Also, longitudinal upper girders are welded to the firewall for reinforcing the lengthened hood for the engine compartment. The radiator is displaced forward from the engine, and an air tunnel is inserted between the radiator and the fan at the front end of the engine.

11 Claims, 16 Drawing Figures

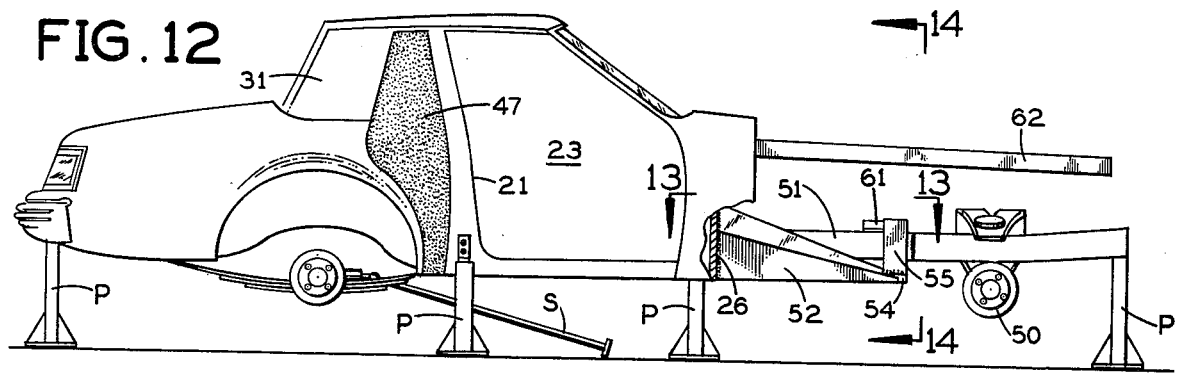
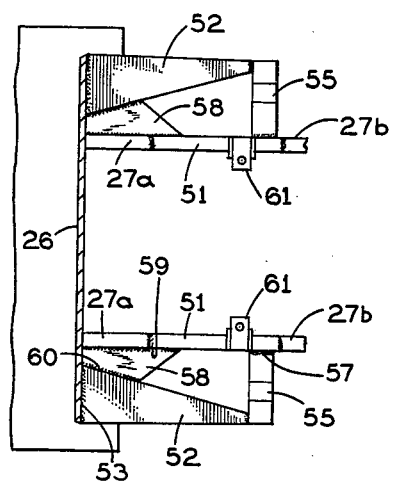
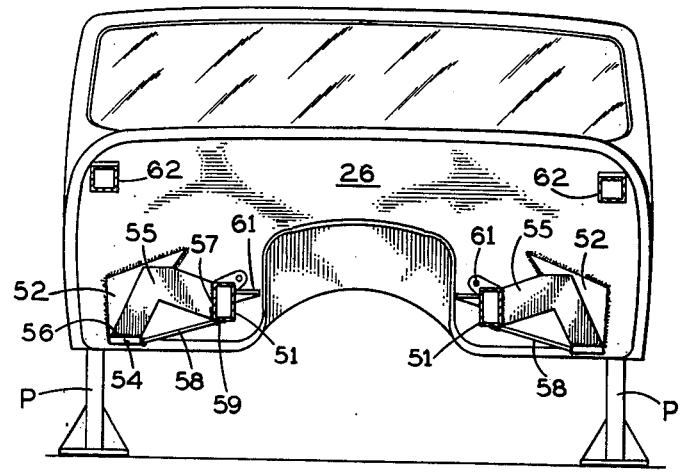
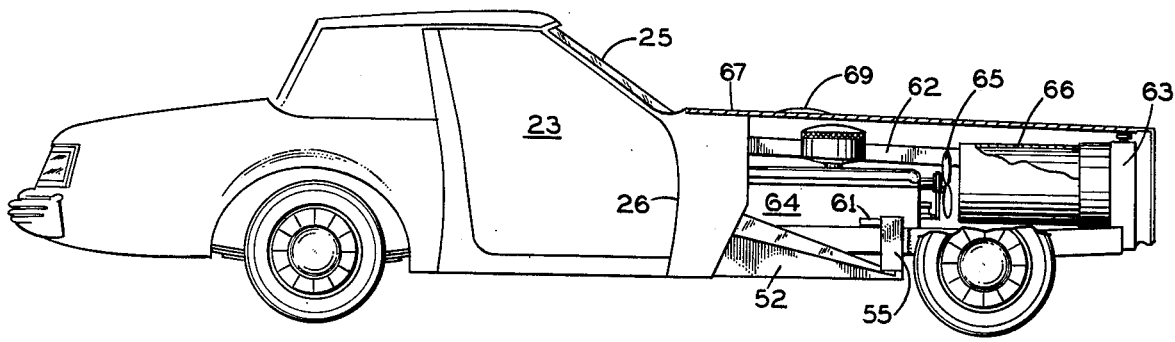
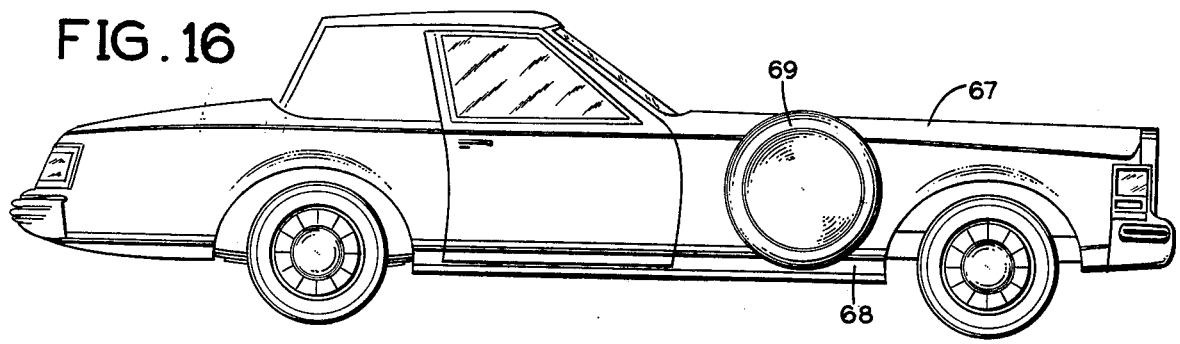

METHOD OF CONVERTING MOTOR CAR

SUMMARY OF THE INVENTION

This invention relates to a method of converting a conventional passenger sedan into a car having a lengthened engine compartment and hood and a body which is correspondingly shortened just behind the door posts.

In the presently preferred embodiment of this invention, a Cadillac "Seville" four-door sedan is shortened by 22 inches immediately behind the door posts and the engine compartment is lengthened by a corresponding amount to provide a more elegant, distinctive appearance.

The shortening of the body involves the removal of segments of the roof and the drive shaft tunnel, and longitudinal segments of the frame, and the removal of the entire floor at the rear seat compartment after the doors have been removed and the drive shaft has been removed from the drive shaft tunnel at the floor. The removed segments of the frame and drive shaft tunnel, while the same length as the removed segment of the roof, are offset forward from the latter. After these segments have been removed, the front and rear sections of the car body are brought together, the rear section is elevated slightly to bring the front and rear sections of the roof into registration, and then the roof sections are welded together. The front and rear sections of the drive shaft tunnel are welded to each other, and a replacement floor panel is welded in place behind the door posts. Side plates are welded to the body on the outside to fill in the spaces between the rear section and the door posts, and suitable filler is applied over these side plates to provide a smooth, finished appearance.

The removed longitudinal segments of the frame below the body are welded into the frame at the engine compartment to lengthen it. Structural reinforcements are welded between the firewall and these inserted segments in the frame at the engine compartment.

The radiator is displaced forward by the length of the frame inserts at the engine compartment. An air tunnel or guide is inserted behind the radiator for guiding cooling air to the fan on the front end of the engine.

The elongated hood is structurally reinforced by upper longitudinal girders, which are welded to the firewall and extending along the top of the engine compartment toward each side.

A principal object of this invention is to provide a novel and improved method of converting a car with a conventional body into one having a body that is shortened immediately behind the door posts and lengthened at the hood and engine compartment.

Further objects and advantages of this invention will be apparent from the following detailed description of a presently-preferred embodiment, shown in the accompanying drawings in which:

FIG. 12 is a view similar to FIG. 11 after the reinforcement pieces (FIG. 10) for the lengthened frame at the engine compartment have been welded in place and body filler has been added to the sides of the car behind the door posts;

FIG. 13 is a fragmentary horizontal section taken along the line 13—13 in FIG. 12 and showing these reinforcement pieces in the top plan view;

FIG. 14 is a vertical cross-section taken along the line 14—14 in FIG. 12;

FIG. 15 is an elevational view of the finished car with the engine compartment hood and other parts broken away for clarity; and FIG. 16 is an elevational view of the finished vehicle modified in accordance with the present invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
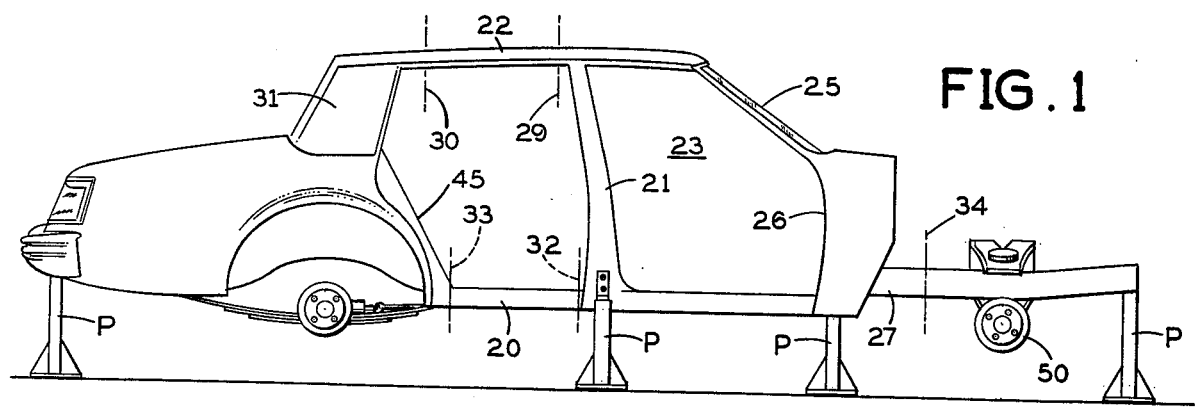
FIG. 1 is a longitudinal elevation of the frame and body of a Cadillac "Seville" 4-door sedan with the wheels, doors, seats, engine, drive train and engine compartment hood removed.

FIG. 1 shows the frame and body of a 1977 Cadillac "Seville" 4-door sedan which is to be converted into a car having a shortened body and a lengthened engine compartment in accordance with the present invention. This vehicle has a frame at the bottom with opposite, longitudinal, horizontal side pieces 20 below the passenger compartment and horizontal cross-pieces (not shown) extending between these longitudinal side pieces. The body has door posts 21 on its opposite sides which extend up from the frame side pieces 20 to a roof 22. These door posts are located between the front door openings and the corresponding rear door openings of the vehicle. The body of the vehicle encloses a passenger compartment 23. A windshield 25 and a firewall 26 below it extend in front of the passenger compartment 23. The firewall separates the passenger compartment from an engine compartment in front.

Below the firewall 26 the vehicle frame has a front cross piece (not shown), and from this cross piece opposite longitudinal side pieces 27 of the frame project foward below the engine compartment at the front of the vehicle. These longitudinal side pieces 27 of the frame at the engine compartment are offset laterally inward and upward from the corresponding side pieces 20 of the frame at the body of the vehicle.

In practicing the present invention, the front and rear seats, front and rear doors, the front and rear wheels and the engine are removed from the sedan prior to its conversion, as now to be described. The stripped vehicle is supported by posts P at suitable intervals along its length.

Figure 2:
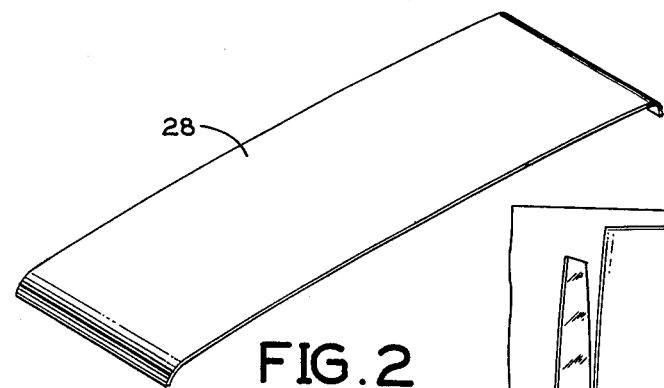
FIG. 2 is a perspective view of a template for use on the FIG. 1 sedan to cut a section from the roof behind the door posts in accordance with the present invention.
Figure 3:
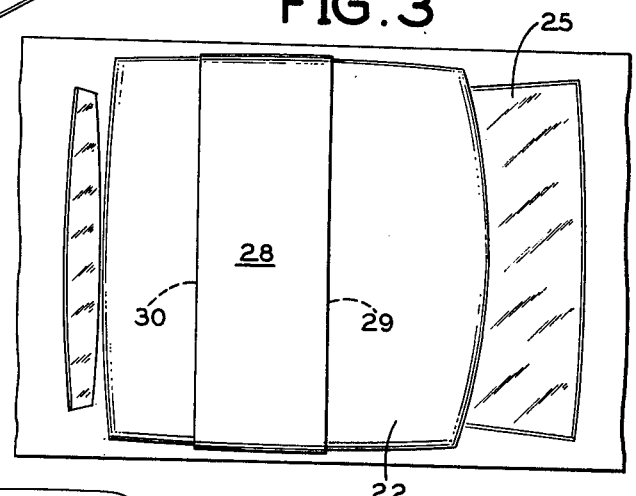
FIG. 3 is a fragmentary top plan view showing this template in place on the roof of the FIG. 1 sedan to guide the cutting operation.

A template 28 (FIG. 2) is placed over the roof 22 between the phantom lines 29 and 30 in FIG. 1. Preferably, this template is shaped to fit snugly across the complete width of the roof (FIG. 3) and it has a front-to-back dimension (between lines 29 and 30 in FIG. 1) of 22 inches. The roof is transversely severed along the lines 29 and 30 at the edges of the template to remove a 22 inch length of the roof, beginning (at 29) a few inches behind the upper ends of the door posts 21 and terminating (at 30) several inches in front of the side panels 31 of the vehicle body directly behind the rear door openings.

After first removing the drive shaft from the drive shaft tunnel T, the frame and the drive shaft tunnel are transversely severed along the phantom lines 32 and 33 in FIG. 1, which are also 22 inches apart. Line 32 is located immediately behind the door posts 21 at their lower ends. Line 33 is located at the bottom rear of the rear door opening. The cut lines 32 and 33 at the frame are offset forward from the cut lines 29 and 30 at the roof, so as not to cut into the rear wheel springs or the sides of the body at the front end of the rear wheel wells. Also, at this time a segment of the floor from the rear cut line 33 forward beyond the door posts 21 is cut away and removed.

After first removing the fenders, the engine compartment hood and the engine and other components normally in the engine compartment, the opposite side pieces 27 of the frame at the engine compartment are transversely severed along the phantom line 34 in FIG. 1 between the firewall 26 and the front wheel suspension.

Figure 5:
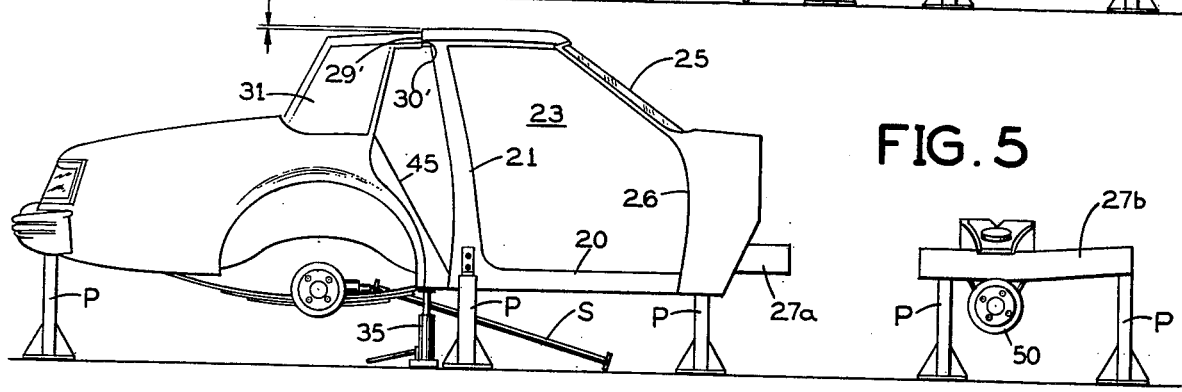
FIG. 5 is a similar view showing the severed sections of the body and frame brought together behind the door posts and the severed sections of the frame at the engine compartment separated longitudinally.
Figure 6:
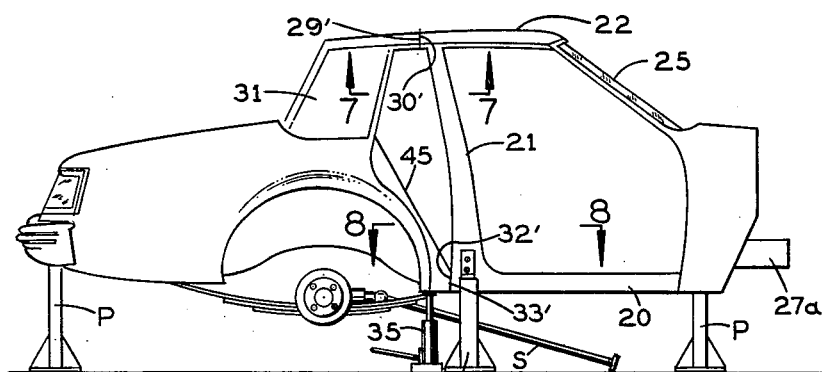
FIG. 6 is a view similar to FIG. 5, with the rear section of the body and frame jacked up so that its roof is even with the roof on the front section of the car body.
Figure 6:
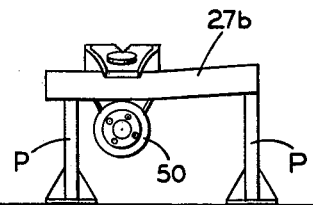

Now the severed front and rear sections of the vehicle body and frame are brought together as shown in FIG. 5 to bring the severed edges 32' and 33' at the floor level into abutting engagement with each other. The front and rear sections of the body do not merge smoothly at the roof, however, because the roof of the rear section at its cut edge 30' is a substantial fraction of an inch lower than the roof of the front section at its cut edge 29'. To eliminate this vertical misalignment, the rear section is elevated slightly by a pneumatic or hydraulic jack 35 at each side (FIG. 5) until the roof lines merge smoothly with each other, as shown in FIG. 6. After such vertical adjustment the abutting front and rear sections of the vehicle body are slightly misaligned vertically at the floor level.

Figure 7:
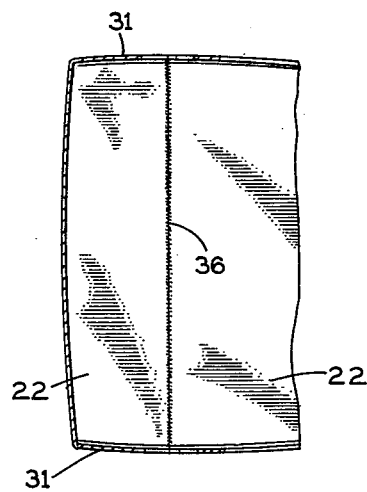
FIG. 7 is a horizontal section taken along the line 7—7 in FIG. 6 and showing the two adjoining roof sections welded to each other.

Now the roof is welded along the transverse line 36 in FIG. 7 where the cut edges 29' and 30' of its front and rear sections abut against one another.

Figure 8:
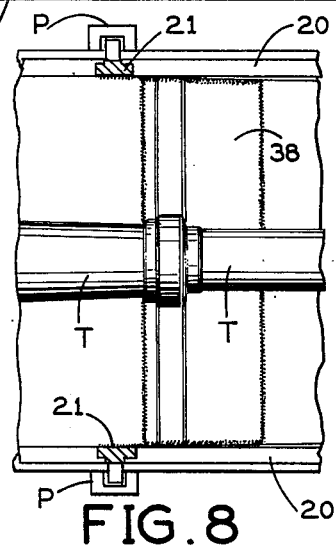
FIG. 8 is a horizontal section taken along the line 8—8 in FIG. 6 and showing the severed rear and front sections of the sedan body, frame and drive shaft tunnel welded to each other.

The severed front and rear sections of the drive shaft tunnel T are welded to each other, as shown at 37 in FIG. 8 after the original drive shaft S has been shortened or replaced by a shorter drive shaft to extend the new, shorter length required.

A floor plate 38 is welded in place above the drive shaft tunnel T to fill in the space left by the removal of the segment of the original floor section in front of the rear cut line 33. This floor plate provides a smooth transition between the unequal floor levels of the front and rear sections of the car.

Figure 9:
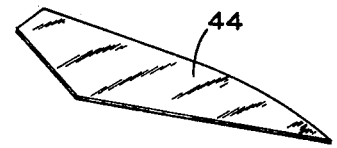
FIG. 9 is a perspective view of one of the side plates for attachment to the sedan body behind its door posts after its rear and front sections have been welded to each other.
Figure 11:
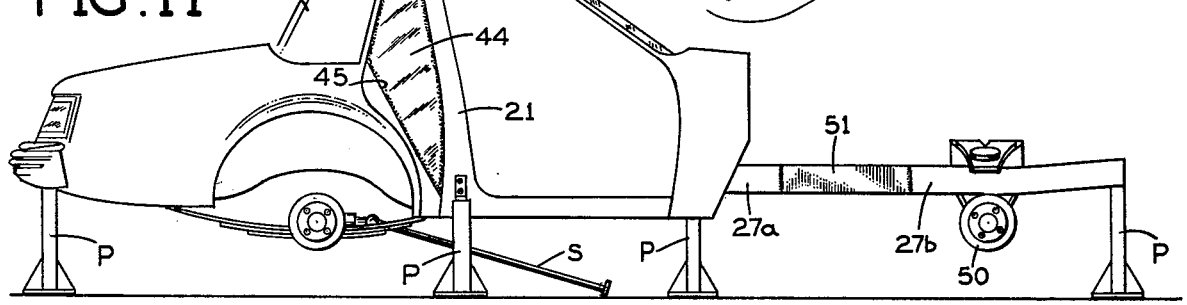
FIG. 11 is an elevational view of the car after the frame at the engine compartment has been lengthened but not yet reinforced.

The spaces in the sides of the vehicle immediately behind the door posts 21 are now filled in by respective irregularly shaped plates 44 (FIG. 9) which fit snugly in these spaces as shown in FIG. 11. The entire periphery of each spacer plate 44 is welded to the back of the door posts 21, the bottom edge of the roof 22 on opposite sides of its weld line 36, the front of the side panels 31, and the front of the inclined back edge walls 45 for what was formerly the lower half of the rear doorway. These plates 44 are structural reinforcements for the body of the vehicle behind the door posts 21, and later they are covered by a conventional body filler 47 (FIG. 12) which merges smoothly with the sides of the vehicle throughout their vertical extent from floor to roof behind the door posts 21 to provide a continuous, uninterrupted appearance (FIG. 15). The rear doors, of course, are not put back on because the rear door openings have been eliminated by the above-described shortening of the body and frame behind the door posts 21.

Figure 4:
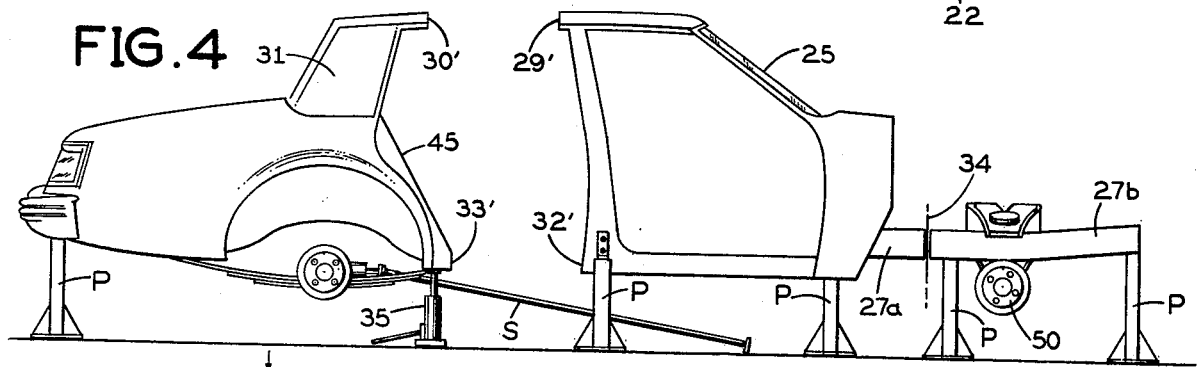
FIG. 4 is a view similar to FIG. 2 showing the sedan after a predetermined length has been severed and removed from its body and frame behind the door posts and its frame has been transversely severed at the engine compartment.

The opposite longitudinal side pieces 27 of the frame at the engine compartment are of hollow rectangular cross-section and after the cross-cut along the line 34 has been made (FIG. 4) each of these side pieces is separated into rear and front segments 27a and 27b. The front segments 27b carry the front wheel suspension of the vehicle. The rear segments 27a remain attached to the front cross piece of the frame below the firewall 26.

Figure 10:
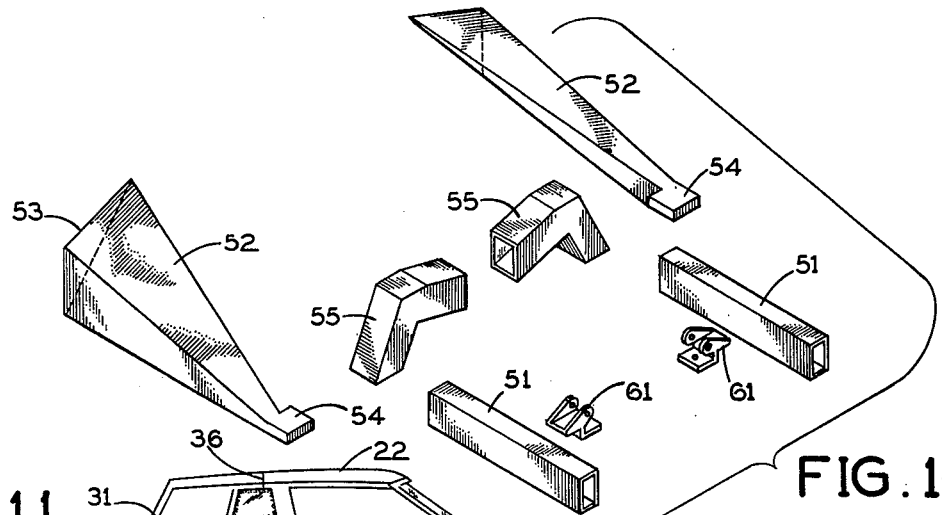
FIG. 10 is an exploded perspective view of the longitudinal frame members and certain of the reinforcement pieces in the lengthened engine compartment.

Referring to FIG. 6, when the front and rear sections of the vehicle body are being welded together the rear and front segments 27a and 27b of the side pieces of the frame at the engine compartment are spaced apart longitudinally about 22 inches. A matching longitudinal frame member 51 (FIG. 10) is now inserted between the frame segments 27a and 27b at each side and is welded to their cut edges at each end (FIG. 11). Consequently, the length of the frame at the engine compartment is increased by substantially as much as the frame at the body was shortened behind the posts 21. Preferably, this is done by using as the insert 51 the piece of the frame that was removed from the same side between the cut lines 32 and 33 in FIG. 1 (behind the door posts 21). Therefore, the frame at the engine compartment is lengthened by the same amount that the frame was shortened behind the door posts 21.

Additional reinforcement is provided for each lengthened frame side piece 27a, 51, 27b at the engine compartment. A rigid longitudinal member 52 of irregular configuration has a triangular back end 53 welded to the firewall 26 of the vehicle body and it projects forward from the firewall at a location laterally outward from the rear segment 27a of the adjacent frame side piece, as best seen in FIG. 13. Each longitudinal reinforcement member 52 terminates at its front end in a flat, horizontal ledge 54 (FIG. 10) which is located at a lower level than the inserted member 51 of the adjacent frame side piece, as best seen in FIGS. 12 and 14.

Rigid cross-pieces 55 (FIG. 10) of rectangular, hollow cross-section join the respective inserted members 51 of the frame side piece to the longitudinal reinforcement pieces 52 at the front end of the latter. As best seen in FIG. 14, each of these cross-pieces 55 is welded at 56 at its lower end to the top of the front end ledge 54 on the respective longitudinal reinforcement member 52 and it projects upward therefrom at a slight acute angle inward and then, after a bend of almost 90°, extends laterally inward and slightly downward over to the inserted member 51 of the adjacent frame side piece. The cross-piece is welded at its inner end, as shown at 57 in FIGS. 13 and 14, to the outer side edge of the inserted member 51 of the frame.

As shown in FIGS. 13 and 14, the reinforcement for the frame at each side of the engine compartment is completed by a flat plate 58 which is welded along one edge to the bottom of the rear segment 27a of the frame side piece along its entire length and to the bottom of the inserted member 51 of the frame side piece for part of its length, as shown at 59 in these Figures. The opposite edge of the plate 58 is welded at 60 to the inside of the corresponding longitudinal reinforcement piece 52. As shown in FIG. 14, the plate 58 extends inward from the reinforcement piece 52 at a slight angle upward to the side piece of the frame at the engine compartment.

Engine mounts 61 of known design (FIG. 10) are attached to the inserted members 51 of the respective frame side pieces immediately behind the cross-pieces 55 of the respective reinforcements, as shown in FIGS. 12 and 13.

The engine compartment also is modified by the addition of a pair of upper longitudinal girders 62 (FIGS. 12 and 14) of rectangular cross-section, which extend forward from the firewall 26 along opposite sides of the engine compartment. The front ends of these girders are attached to the framework at the front of the engine compartment which supports the headlamps on opposite sides of the radiator 63 (FIGS. 15).

The original engine 64 of the vehicle is supported by the engine mounts 61 which are fastened to the inserted frame segments 51 in the opposite side pieces of the frame at the engine compartment. A tubular air guide or tunnel 66 is inserted behind the radiator 63 at the front end of the engine compartment to guide cooling air to the fan 65 at the front end of the engine 64.

A hood 67 (FIG. 16) of the desired extra length is mounted to extend over the top of the lengthened engine compartment and correspondingly lengthened front fenders 68 are provided along each side of the engine compartment. Preferably, one or both fenders incorporate a spare wheel cover 69.

I claim:

1. A method of converting a passenger car to provide a shortened body and a lengthened engine compartment which comprises the steps of:
   removing the doors, the engine, the front fenders and engine compartment hood from the car and removing the drive shaft from the drive shaft tunnel;
   removing longitudinal segments of the frame and body of the car, including the drive shaft tunnel, immediately behind the door posts to sever the car body into front and rear sections;
   bringing the severed front and rear sections of the car body into aligned, abutting juxtaposition at the roof and joining corresponding parts of said sections, including the drive shaft tunnel, to each other to provide a converted, unitary car body which has been shortened immediately behind the door posts;
   putting a correspondingly shorter drive shaft in the shortened drive shaft tunnel;
   closing the openings in the opposite sides of the converted body immediately behind the door posts;
   severing the frame transversely at the engine compartment and longitudinally separating the severed rear and front sections of the frame thereat;
   inserting longitudinal frame segments between the separated sections of the frame at the engine compartment and joining said inserted frame segments at each end to the adjoining sections of the frame;
   mounting the engine on the inserted frame segments at the engine compartment;
   and attaching to the car body a correspondingly longer engine compartment hood and front fenders.

2. A method according to claim 1, wherein said longitudinal segments which are removed from the body and the frame are of the same length at the roof and at the frame, but the removed segments of the frame are offset forwardly from the removed segments at the roof.

3. A method according to claim 1, wherein a segment of the floor is removed which extends forward past the door posts so as to leave an opening in the floor where said front and rear sections of the car body are joined to each other, and further comprising the step of joining to said front and rear sections a floor plate which extends across said opening.

4. A method according to claim 1, wherein said closing of the openings in the opposite sides of the converted body immediately behind the door posts is effected by:
   inserting side plates behind the door posts which substantially fit said openings;
   joining said side plates to said front and rear sections of the car body;
   and applying body filler over said side plates to blend with the sides of the car at said rear section thereof.

5. A method according to claim 1, and further comprising the steps of:
   joining rigid reinforcing pieces to the firewall of the car and to said inserted frame segments to reinforce the frame at the engine compartment.

6. A method according to claim 1, and further comprising the step of:
   inserting an air tunnel between the radiator at the front end of the engine compartment and the fan on the front of the engine mounted on said inserted frame segments at the engine compartment.

7. A method according to claim 1, wherein:
   said longitudinal segments which are removed from the body and the frame are of the same length at the roof and at the frame, but the removed segments of the frame are offset forwardly from the removed segments at the roof;
   and a segment of the floor is removed which extends forward past the door posts so as to leave an opening in the floor where said front and rear sections of the car body are joined to each other;
   and further comprising the step of:
   joining to said front and rear sections a floor plate which extends across said opening.

8. A method according to claim 7, wherein said closing of the openings in the opposite sides of the converted body immediately behind the door posts is effected by:
   inserting side plates behind the door posts which substantially fit said openings;
   joining said plates to said front and rear sections of the car body;

and applying body filler over said side plates to blend with the sides of the car at said rear section thereof.

9. A method according to claim 8, and further comprising the steps of:
joining rigid reinforcing pieces to the firewall of the car and to said inserted frame segments to reinforce the frame at the engine compartment;
and inserting an air tunnel between the radiator at the front end of the engine compartment and the fan on the front of the engine mounted on said inserted frame segments at the engine compartment.

10. A method according to claim 4, and further comprising the steps of:
joining rigid reinforcing pieces to the firewall of the car and to said inserted frame segments to reinforce the frame at the engine compartment.

11. A method according to claim 10, and further comprising the step of:
inserting an air tunnel between the radiator at the front end of the engine compartment and the fan on the front of the engine mounted on said inserted frame segments at the engine compartment.

* * * * *